Sept. 1, 1959     K. H. WITTLAKE     2,902,662
VARIABLE-RESISTANCE DEVICE
Filed June 30, 1958     2 Sheets-Sheet 1

INVENTOR
KARL H. WITTLAKE
BY: Maybee & Legris
ATTORNEYS

Sept. 1, 1959 K. H. WITTLAKE 2,902,662
VARIABLE-RESISTANCE DEVICE
Filed June 30, 1958 2 Sheets-Sheet 2
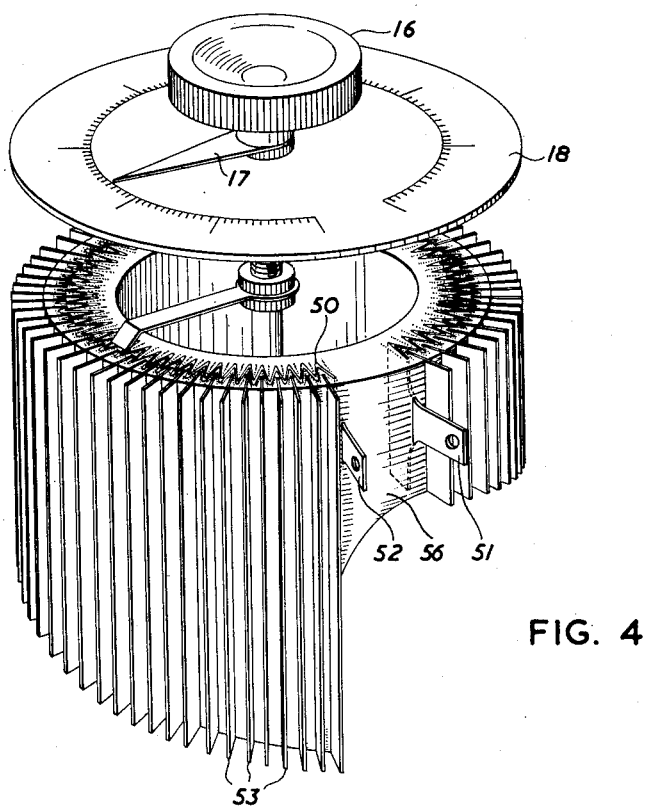
FIG. 4
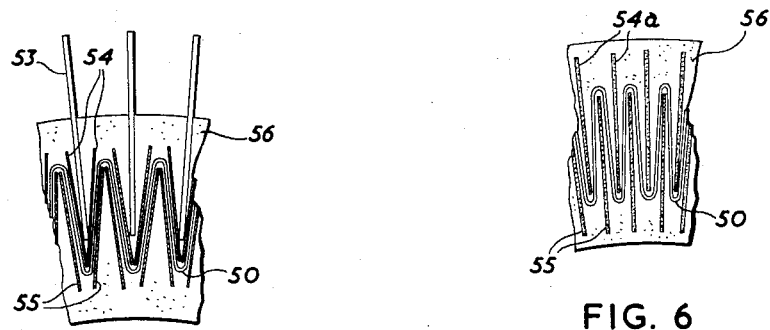
FIG. 5
FIG. 6
INVENTOR
KARL H. WITTLAKE
BY: Maybee & Legris
ATTORNEYS

United States Patent Office 2,902,662
Patented Sept. 1, 1959

2,902,662

VARIABLE-RESISTANCE DEVICE

Karl Hugo Wittlake, Hamilton, Ontario, Canada, assignor to Orenda Engines Limited, Village of Malton, Peel, Ontario, Canada Application June 30, 1958, Serial No. 745,621

12 Claims. (Cl. 338—51)

This invention is concerned with a variable-resistance device such as a potentiometer or rheostat, and is particularly concerned with a resistance element in which a predetermined non-linear rate of change of resistance per unit length of of the element may be accurately obtained, and in which the rate of change may be accurately adjusted to suit particular design requirements after fabrication of the element.

Non-linear resistance elements for variable-resistance devices have been previously proposed, and where the resistance elements are to be mass produced it can conveniently and economically be arranged for the resistance element to have a predetermined rate of change of resistance per unit length of the elements for any particular batch of resistance elements being manufactured at one time. A common form of such a resistance element is one in which a strip of insulating material is used as a former for a coil of resistance wire, and in this case the former can be accurately preshaped to give the necessary rate of change of resistance per unit length of the resistance element. However, once such a resistance element is fabricated no alteration can conveniently be made to modify the designed rate of change of resistance per unit length of the element, and therefore the rate of change of resistance of that element cannot be modified or adjusted to suit a particular, and possibly unique design requirement. Another common form of resistance element is in the form of a strip of an electrically semi-conductive material, one of the major faces of which is traversed by a cursor. In this case also the desired rate of change of resistance per unit length of the element can accurately be pre-arranged by varying the width, and thus the transverse cross-sectional area of the strip, or by removing portions of the strip such as by punching holes through it; but, once the strip is assembled into a variable-resistance device it is then extremely difficult to adjust the rate of change of resistance per unit length of the element to accommodate a particular design requirement.

An object of the invention is to provide a resistance element for a variable-resistance device, in which the rate of change of resistance per unit length of the element can conveniently be adjusted or modified after fabrication of the element.

A further object is to provide a variable-resistance device including the resistance element of the invention, in which the rate of change of resistance per unit length of the element can conveniently be modified or adjusted without the necessity of disassembling the variable-resistance device.

According to the invention, the resistance element for a variable-resistance device is comprised by a transversely-crimped strip of an electrically semi-conductive material, one longitudinal edge of the strip lying in a surface which extends transversely of the width of the strip and which is to be traversed by a cursor for the cursor to be in continuous electrical contact therewith, the strip having means associated with it providing electrical connections and being of differing width at spaced positions along its length for the effective transverse cross-sectional area of the strip and thus its electrical resistance characteristics to vary along its length.

As readily will be appreciated, as the cursor is to traverse along one edge only of the strip the other edge of the strip can be arranged to lie in a position in which it can easily and conveniently be subjected to a machining operation in order that the transverse cross-section of the strip may be reduced to adjust the resistance characteristics of the strip to meet any particular requirement.

According to a further feature of the invention, the variable-resistance device is comprised by a transversely-crimped strip of an electrically semi-conductive material, a cursor adapted to traverse one longitudinal edge of the strip in continuous electrical contact therewith, and electrical connection means for the strip and the cursor, the strip being of differing width at spaced positions along its length for the effective transverse cross-sectional area of the strip and thus its electrical resistance characteristics to vary along its length.

Further objects and advantages of the invention will become apparent from a study of the following specification when taken in conjunction with the accompanying drawing, in which, Figure 1 is a perspective view of one form of variable-resistance device according to the invention in the form of a potentiometer, Figure 1 also indicating schematically the electrical circuit diagram of apparatus for use when adjusting the rate of change of resistance per unit length of the resistance element of that device;

Figure 4 is a perspective view of a preferred form of variable-resistance device according to the invention in the form of a potentiometer;

Figure 5 is a fragmentary view of the resistance element of the device shown in Figure 4, and showing in greater detail the arrangement of various components of the resistance element; and, Figure 6 is a view corresponding to Figure 5 and showing a modification of the structure shown in Figure 5.

Figure 1:
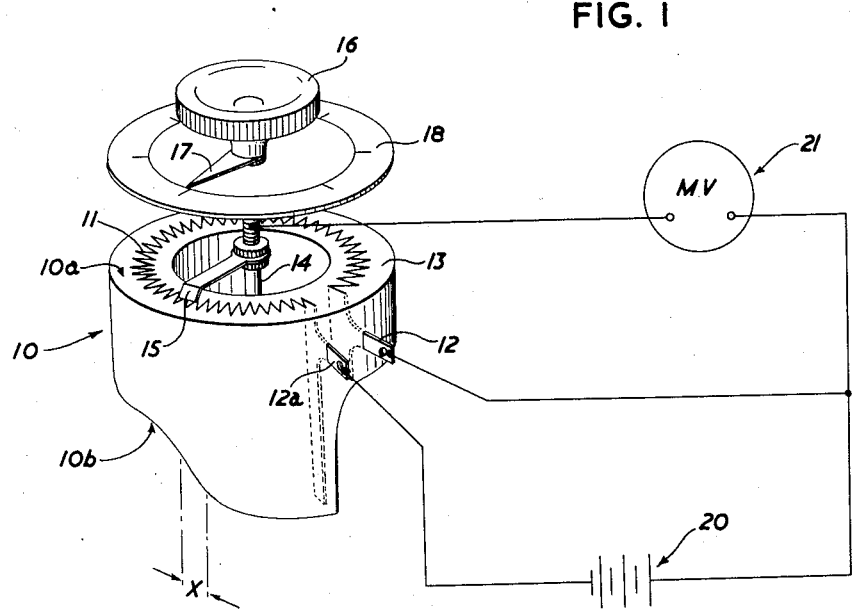

Referring now to Figure 1, the potentiometer includes a resistance element indicated generally at 10, the resistance element including a transversely-crimped strip 11 of electrically semi-conductive material, the strip having lugs 12 and 12a by means of which the strip may be connected in an electrical circuit. Obviously, one of the lugs 12 or 12a could be dispensed with if not required. The lugs 12, 12a extend through a body 13 of electrical insulating material which provides structural support for the strip 11 and which also provides a support for bearings (not shown) for a shaft 14 which carries a cursor 15 and an operating knob 16. The shaft 14 also carries a pointer 17 which co-operates with a scale 18 to be associated with a stationary member on which the potentiometer is to be mounted. Any convenient means may be provided for mounting the potentiometer on the said structural member.

Strip 11 may be formed, for example, from material such as oxidized metal, and is embedded in the body of insulating material 13 by casting or otherwise forming the body around the strip. The body 13 may be of phenolic resin with a glass-fibre filler, or, where high temperatures are expected to be encountered, the body 13 may be of silicone resin with an asbestos filler, or even of a ceramic material.

After the resistance element has been formed, one face, the face 10a in the drawings, is accurately machined to provide a track for the cursor 15 so that in any angular position of adjustment the cursor 15 is in intimate electrical contact with the edge of the strip 10. In the drawings, the face 10a and sliding face of the cursor is shown as being flat, but, as readily will be appreciated, the sliding face of the cursor may be of other configurations, in which case a corresponding change in transverse contour of the face 10a would be made for it to be complementary to the sliding face of the cursor.

After assembly of the potentiometer the rate of change of resistance per unit length of the resistance element may be adjusted in the following manner:

The lugs 12 and 12a are connected to the terminals of a battery, indicated at 20, and a millivoltmeter, indicated at 21, is connected between the lug 12 or 12a and the cursor 15. The cursor 15 is then moved to the desired angular position of adjustment, and the face 10b of the resistance element opposed to the face 10a is machined away at a position directly opposed to the cursor, for example over the length indicated at X, until the desired current reading is obtained at the millivoltmeter 21. The cursor is then adjusted angularly a few degrees and the machining operation is repeated until the necessary reading is obtained on the millivoltmeter, this procedure being carried out until the entire length of the resistance element conforms to the desired rate of change of resistance per unit length of the resistance element.

Figure 2:
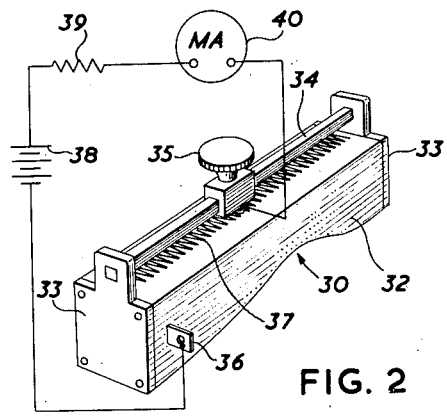
Figure 2 is a perspective view of another form of variable-resistance device according to the invention in the form of a rheostat, Figure 2 also indicating schematically the electrical circuit diagram of apparatus for use when adjusting the rate of change of resistance per unit length of the resistance element of that device.

Referring now to Figure 2, which shows a rheostat incorporating a resistance element according to the invention, the resistance element, indicated generally at 30, includes a transversely-crimped strip 31 of an electrically semi-conductive material which is embedded in a body 32 of a suitable insulating material, the resistance element being mounted between end plates 33 which carry guide rods 34 for a cursor 35 of conventional form. As shown in the drawing, one end of the strip 31 is connected to a lug 36 by means of which the strip may be connected in an electrical circuit, but, as will be obvious a lug may be provided at each end of the strip, as is the case with the potentiometer shown in Figure 1.

The rate of change of resistance per unit length of the resistance element of the rheostat shown in Figure 2 may be adjusted in the manner described above with reference to Figure 1, the electrical circuit of the apparatus for that purpose including a battery 38 which is connected in series with a current limiting resistance 39 and a milliammeter 40.

Again, by moving the cursor to a selected position along the length of the strip 31 and by grinding away the lower edge of the strip the reading on the milliammeter can be brought to that required for the particular application of the rheostat, the procedure being repeated along the entire length of the strip to bring the resistance characteristics to those required.

Figure 3:
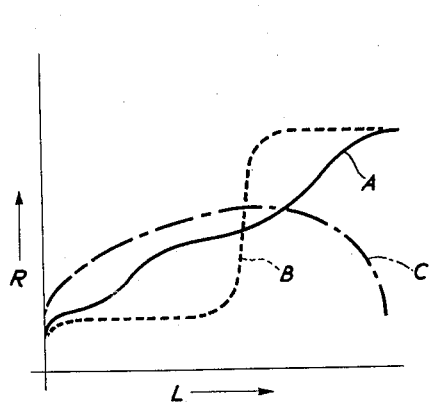
Figure 3 is a graph illustrating how the rate of change of resistance per unit length of the resistance element may be arranged to meet a particular requirement.

Figure 3 indicates diagrammatically and by way of example various resistance curves which may be obtained with the variable-resistance device according to the invention, the abscissa of the graph representing the units of length of the resistance element, and the ordinate representing the units of resistance. For example, and as indicated by curve A, the resistance per unit length of the element may rise in a series of gradually rising curves, or, as indicated by the curve B may be of relatively slow rate and then rise sharply at some point intermediate the ends of the resistance element. The curve C illustrates how a curve approximating a sinus may be obtained by connecting the lugs 12 and 12a together.

Referring now to Figures 4 and 5, which show a preferred form of construction of the resistance element, the transversely-crimped strip of electrically semi-conductive material is indicated at 50, and the terminal lugs of the strip at 51, 52. Extending from a position between the radially outwardly facing surface portions of the crimps of the strip, are a plurality of metal plates 53 which are to act as heat-dissipating fins, the portions of the plates 53 which lie between the crimps being electrically isolated from the adjacent surface portions of the strip by means of spacers 54 of electrical insulating material, for example, glass cloth of fibre, or asbestos cloth or fibre.

Similarly, the radially inwardly facing surface portions of the crimps of the strip have interposed between them spacers 55 of electrical insulating material to electrically isolate the adjacent surface portions of the crimps of the strip.

The strip 50, the plates 53 and the spacers 54 and 55 are assembled and a body 56 of electrical insulating material is cast around them for the plates 53 to extend radially from the outer peripheral surface of the body of insulating material. The various components of the resistance element may be formed from materials similar or identical to those described with reference to Figure 1, and, as will be readily appreciated, a greater or less number of crimps may be employed than that shown in the drawing.

The construction shown in Figures 4 and 5 is particularly adapted to use where the resistance element is to carry high loads and in which considerable heat is dissipated. However, where the resistance element is to carry lower loads the construction may be modified as shown in Figure 6, in that the heat dissipating plates 53 are omitted and a single spacer 54a is provided between adjacent surface portions of the radially outwardly facing surface portions of the crimps of the strip.

The constructions of variable-resistance devices shown in the drawings are given by way of example only, and, as readily will be appreciated, various modifications of the specific structures disclosed may be made to meet specific requirements without departing from the spirit of the invention. It is to be understood that the constructions shown in the drawings and described herein are to be taken by way of example only and as illustrating the invention defined in the appended claims.

What I claim as my invention is:

1. A variable-resistance device comprised by a transversely-crimped strip of an electrically semi-conductive material, electrical connection means at at least one end of the strip, a cursor adapted to traverse one longitudinal edge of the strip in continuous electrical contact therewith, and electrical connection means for the cursor, the strip being of differing width at spaced positions along its length for the effective transverse cross-sectional area of the strip and thus its electrical resistance characteristics to vary along its length.

2. A variable-resistance device comprised by a transversely-crimped strip of an electrically semi-conductive material, spacers of an electrical insulating material positioned between each crimp of the strip to electrically isolate the adjacent surface portions of the crimps of the strip, electrical connection means at at least one end of the strip, a cursor adapted to traverse one longitudinal edge of the strip in continuous electrical contact therewith, and electrical connection means for the cursor, the strip being of differing width at spaced positions along its length for the effective transverse cross-sectional area of the strip and thus its electrical resistance characteristics to vary along its length.

3. A variable-resistance device comprised by a transversely-crimped strip of an electrically semi-conductive material, plates of a material of good thermal conduction properties extending laterally of the strip from a position between selected ones of the crimps of the strip, spacers of an electrical insulating material positioned at each side of said plates to electrically isolate the surface of adjacent portions of the crimps of the strip from said plates, spacers of an electrical insulating material positioned between the remaining crimps of the strip to electrically isolate the adjacent surface portions of the crimps, electrical connection means at at least one end of the strip, a cursor adapted to traverse one longitudinal edge of the strip in continuous electrical contact therewith, and electrical connection means for the cursor, the strip being of differing width at spaced positions along its length for the effective transverse cross-sectional area of the strip and thus its electrical resistance characteristics to vary along its length.

4. A variable-resistance device comprised by a transversely-crimped strip of an electrically semi-conductive material, a body of electrical insulating material in which said strip is embedded for at least one longitudinal edge of the strip to be exposed, electrical connection means associated with at least one end of the strip, a cursor adapted to traverse said one edge of the strip in continuous electrical contact therewith, the body of insulating material having a surface providing a track for said cursor, and electrical connection means associated with the cursor, the strip being of differing width at spaced positions along its length for the effective transverse cross-sectional area of the strip and thus its electrical resistance characteristics to vary along its length.

5. A variable-resistance device comprised by a transversely-crimped strip of an electrically semi-conductive material, spacers of an electrical insulating material positioned between each crimp of the strip to electrically isolate the surface of adjacent portions of the crimps of the strip, a body of electrical insulating material in which said strip and spacers are embedded for at least one longitudinal edge of the strip to be exposed, electrical connection means associated with at least one end of the strip, a cursor adapted to traverse one edge of the strip in continuous electrical contact therewith, the body of insulating material having a surface providing a track for said cursor, and electrical connection means associated with said cursor, the strip being of differing width at spaced positions along its length for the effective transverse cross-sectional area of the strip and thus its electrical resistance characteristics to vary along its length.

6. A variable-resistance device comprised by a transversely-crimped strip of an electrically semi-conductive material, plates of a material of good thermal conduction properties extending laterally of the strip from a position between selected ones of the crimps of the strip, spacers of an electrical insulating material positioned at each side of said plates to electrically isolate the surface of adjacent portions of the crimps of the strips from said plates, spacers of an electrical insulating material positioned between the remaining crimps of the strip to electrically isolate the surface of adjacent portions of the crimps, a body of electrical insulating material in which said strip, plates and spacers are embedded for at least one longitudinal edge of the strip to be exposed and for said plates to extend from a surface of said body of insulating material, electrical connection means associated with at least one end of the strip, a cursor adapted to traverse said one edge of the strip in continuous electrical contact therewith, the embedding insulating material having a surface providing a track for said cursor, and electrical connection means associated with the cursor, the strip being of differing width at spaced positions along its length for the effective transverse cross-sectional area of the strip and thus its electrical resistance characteristics to vary along its length.

7. A resistance element for a variable-resistance device, comprised by a transversely-crimped strip of an electrically semi-conductive material, one longitudinal edge of the strip lying in a surface which extends transversely of the width of the strip and which is to be traversed by a potentiometer cursor for the cursor to be in continuous electrical contact therewith, and electrical connection means associated with at least one end of the strip, the strip being of differing width at spaced positions along its length for the effective transverse cross-sectional area of the strip and thus its electrical resistance characteristics to vary along its length.

8. A resistance element according to claim 7, in which spacers of electrical insulating material are positioned between each crimp of the strip to electrically isolate the surface of the adjacent portions of the crimp of the strip.

9. A resistance element according to claim 7, including plates of a material of good thermal conduction properties extending laterally of the strip from a position between selected ones of the crimps of the strip, spacers of an electrical insulating material positioned at each side of said plates to electrically isolate the surface of adjacent portions of the crimp of the strip from said face, and spacers of electrical insulating material positioned between the remaining crimp of the strip to electrically isolate the surface of adjacent portions of the crimp.

10. A resistance element for a variable-resistance device, comprised by a transversely-crimped strip of an electrically semi-conductive material, a body of electrically insulating material in which said strip is embedded for at least one longitudinal edge of the strip to be exposed, said one longitudinal edge of the strip terminating at a surface of the body of insulating material which extends transversely of the width of the strip and which is to be traversed by a potentiometer cursor for the cursor to be in continuous electrical contact with said strip, and electrical connection means associated with at least one end of the strip, the strip being of differing width at spaced positions along its length for the effective cross-sectional area of the strip and thus its electrical resistance characteristics to vary along its length.

11. A resistance element according to claim 10, including spacers of electrical insulating material positioned between each crimp of the strip to electrically isolate the surface of adjacent portions of the crimp of the strip.

12. A resistance element according to claim 10, including plates of good thermal conductive properties extending laterally of the strip from a position between selected ones of the crimp provided by the crimps of the strip, spacers of an electrical insulating material positioned at each side of said plates to electrically isolate the surface of adjacent portions of the crimp of the strip from said plate, and spacers of an electrical insulating material positioned between the remaining crimp of the strip to electrically isolate the surface of adjacent portions of the crimps.

References Cited in the file of this patent

UNITED STATES PATENTS

| | | |
|---|---|---|
| 1,496,745 | Scott | June 3, 1924 |
| 1,992,410 | Benkelman | Feb. 26, 1935 |